United States Patent [19]

Urwin et al.

[11] Patent Number: 5,163,626
[45] Date of Patent: Nov. 17, 1992

[54] DESTRUCTION PROCESS

[75] Inventors: Donald Urwin, Middlesbrough; Andrew T. Sayer, Stockton on Tees; Colin R. Howarth, Newcastle upon Tyne; Craig Wallis, Birmingham, all of England

[73] Assignee: Tioxide Group Services Limited, London, United Kingdom

[21] Appl. No.: 826,412

[22] Filed: Jan. 27, 1992

[30] Foreign Application Priority Data

Feb. 9, 1991 [GB] United Kingdom ............... 9102767

[51] Int. Cl.⁵ .................... A62D 3/00; B01J 19/12; B01J 19/18
[52] U.S. Cl. ................................ 241/1; 241/46.01
[58] Field of Search ............ 241/1, 46.01, 275, 301; 502/159, 163

[56] References Cited

U.S. PATENT DOCUMENTS

| | | | |
|---|---|---|---|
| 3,402,897 | 9/1968 | Willens | 241/46.01 |
| 4,303,486 | 12/1981 | Bard et al. | |
| 4,806,514 | 2/1989 | Langford et al. | 502/159 |
| 4,893,756 | 1/1990 | Fetchenko et al. | 241/1 |
| 5,045,288 | 9/1991 | Raupp et al. | 422/186.3 |

FOREIGN PATENT DOCUMENTS

| | | |
|---|---|---|
| 76028/87 | 1/1988 | Australia. |
| 002568 | 6/1979 | European Pat. Off. . |
| 020055 | 12/1980 | European Pat. Off. . |
| 053881 | 6/1982 | European Pat. Off. . |
| 0056001 | 7/1982 | European Pat. Off. . |
| 078118 | 5/1983 | European Pat. Off. . |
| 080311 | 6/1983 | European Pat. Off. . |
| 0306301 | 3/1989 | European Pat. Off. . |
| 2450612 | of 0000 | France . |
| 1439235 | 6/1976 | United Kingdom . |
| 328410 | of 0000 | United Kingdom . |

OTHER PUBLICATIONS

Chen-Yung Hsiao et al., "Heterogeneous Photocatalysis:Degradation of Dilute ...," Journal of Catalysis, pp. 418-423, Feb. 4, 1983.
Ollis, "Contaminant Degradation in Water," Environ. Sci. Technol., pp. 480-484 (1985).
Serpone et al., "Photocatalysis Over $TiO_2$ Supported on a Glass Substrate," Solar Energy Materials, pp. 121-127 (May 19, 1986).
Matthews, "Photooxidation of Organic Impurities ...," J. Phys. Chem., pp. 3328-3333 (1987).
Matthews, "Carbon Dioxide Formation from Organic Solutes ...," Aust. J. Chem., pp. 667-675 (1987).
Al-Ekabi et al., "Kinetic Studies in Heteogeneous Photocatalysis ...," J. Phys. Chem., pp. 5726-5731, Apr. 25, 1988.
Tanguay et al., "Dichloromethane Photodegradation Using Titanium Catalysts," Journal of Catalysis, pp. 335-347, Jan. 17, 1989.
Matthews, "Purification of Water With Near-U.V. Illuminated ...," Wat. Res. vol. 24, pp. 653-660 (1990).
Australian Journal of Chemistry, "Carbon Dioxide ... of Solute Concentrations," vol. 40, No. 4, 1987.
Environmental Science and Technology, "Contaminant Degradation in Water," vol. 19, No. 6, 1985.

Primary Examiner—Douglas D. Watts
Attorney, Agent, or Firm—Baker & Botts

[57] ABSTRACT

A process for the decomposition of photocatalytically decomposable organic material includes exposing the organic material to ultraviolet light as the material is passed across the surface of a spinning disc. The organic material is in the form of a liquid dispersion, preferably an aqueous dispersion and the dispersion also contains anatase titanium dioxide which acts as a catalyst in the decomposition process. Preferably the anatase titanium dioxide has a high surface area.

Organic materials such as hydrocarbons, alcohols, acids, esters and others are destroyed in this environmentally acceptable process.

14 Claims, 1 Drawing Sheet

DESTRUCTION PROCESS

This invention relates to a destruction process and particularly to a process for the decomposition of organic material by ultraviolet light.

According to the present invention a process for the decomposition of photocatalytically degradable organic material comprises exposing a liquid dispersion of said organic material and anatase titanium dioxide to ultraviolet light and passing said dispersion across the surface of a plate-like member rotating about a central axis perpendicular to the radial plane of said member thereby accelerating said dispersion radially outwardly of said axis across aid surface of said member.

Generally speaking this invention makes use of a so-called "spinning disc reactor". This type of reactor includes within a reaction chamber a plate-like member or an assembly of a plurality of such members which is rotated about its central axis, usually a vertical axis, but a horizontal axis, or any other orientation is not excluded, to effect transfer of a liquid material from the central axis radially across the plate or plates to agitate and disturb said liquid material. Usually the liquid will be transferred either horizontally or vertically depending on the orientation of the plate. This type of reactor has now been found to be of value in promoting the degradation of photodegradable organic materials since it is designed to maximise turbulence within a very thin liquid film. This high degree of turbulence facilitates the mass transfer of oxygen, organic entities, reaction products and intermediates, and other reactive species across the catalyst/liquid, and liquid/gas, interfaces within the system. Most other devices incorporating an immobilised $TiO_2$ suffer from mass transfer limitations.

The plate-like member usually has the form of a disc and the surface which is to contact the organic material can be provided with protrusions, indentations or can be corrugated, porous or perforated. As the plate-like member is rotated liquid flows from the central axis radially outwardly across the surface of the member and is accelerated and agitated.

Usually the organic material to be treated in the process of the invention is introduced into the reactor at the centre of the plate-like member and conveniently is introduced along the axis through a support for the member which also provides the rotational drive to the plate-like member from a suitably located electric motor or other rotational drive unit, e.g. a hydraulic motor.

The plate-like member can be formed from any material which is sufficiently strong to withstand the stress generated in the material during use. Preferably the material is substantially resistant to attack by any compound with which it is brought into contact during use. Typically the plate-like member is formed of glass, ceramic or perferably a material such as stainless steel, nickel or titanium but other materials such as wood, porous plastic and paper can be used. A borosilicate glass plate-like member has been found to be useful when the member is formed of glass.

Typically the plate-like member when in the form of a disc has a diameter of from 25 cm to 5 meters. The member can have a thickness of from 0.05 mm to 50 mm, perferably from 0.25 mm to 5.0 mm, especially from 0.5 mm to 2.5 mm.

If desired the plate can have a series of concentric grooves on the upper surface to be contacted with the liquid. V-shaped grooves presenting a continuously decreasing gradient to the liquid as it travels across the surface of the plate-like member increase the retention of the liquid on the surface at higher rotational speeds of the member.

Generally speaking the speed of rotation of the plate-like member is in the range 50 rpm to 10,000 rpm and preferably in the range 1900 rpm to 5000 rpm. The speed of rotation affects the acceleration of the liquid across the surface of the plate-like member.

The speed of rotation and the rate of flow of liquid onto the surface of the plate-like member are such that a thin film of the liquid is formed on the rotating surface of the member and this thin film is subjected during rotation to a high degree of turbulence as it is thrown radially outwardly of the member.

Normally the plate-like member is mounted with its surface horizontal, or vertical, and it is the upper surface across which the liquid is caused to flow during exposure to ultraviolet light.

Degradation of the organic material is promoted by a photoactive catalyst. In the process of the present invention the catalyst is anatase titanium dioxide, typically that produced by the hydrolysis of a soluble titanium compound such as titanyl sulphate or titanium tetrachloride and which after precipitation is calcined to produce the anatase titanium dioxide. Preferably the calcination conditions are chosen so that the time and/or temperature is somewhat less than that which would be required to produce optimum pigmentary anatase titanium dioxide. The catalyst preferably has a high surface area of from 20 to 200 $m^2/gm$. Typically a hydrated precipitate of titanium dioxide is calcined at a temperature of from 100° C. to 1000° C. for 10 minutes to 1000 minutes. Usually the anatase titanium dioxide has a particle size of from 0.001 micron to 1.0 micron.

If desired the anatase titanium dioxide can be produced by the oxidation of a titanium halide such as titanium tetrachloride under conditions such that the product has the desired high surface area.

The organic material to be treated in the process of the invention is in the form of a fluid during treatment. Where the organic material to be degraded is a liquid itself then it can be treated directly. However the organic can be dissolved or dispersed in water or in any other suitable medium prior to treatment. Aqueous solutions are preferred since a product of the degradation process is water and usually the aqueous solution can have an pH value but preferably is acidic and more preferably has a pH less than 4.

The anatase titanium dioxide is mixed with the organic material in fluid form to form said liquid dispersion of the catalyst and the organic material. The dispersion can contain a wide range of amounts of the catalyst and the organic material but usually will contain from 0.1 gpl to 10 gpl catalyst and 0.1 ppb to 1000 ppm of the organic material.

Activation of the anatase titanium dioxide catalyst is ensured by exposing the catalyst to the effect of ultraviolet light. The liquid dispersion to be treated is exposed to the light as it is in contact with the surface of the plate-like member and whilst ultraviolet light of any wavelength can be used it has been found that light emitted by socalled low pressure lamps is more effective in promoting degradation of the organic material. Typically UV light of up to 400 nanometers can be used but the most preferred light is that having a wavelength of from 240 to 280 nm.

The process can be operated batchwise or continuously. In batch operation the liquid dispersion to be treated is held in a holding tank and recycled across the surface of the rotating plate member until all necessary degradation has been completed. Alternatively continuous operation can be effected, if the required degradation is obtained, by a single pass across the surface of the plate member or by a succession of passes across a number of different plate members. Usually suitable analytical means will be employed to test the extent of degradation prior to discharge of water to the environment.

Any organic compound which is capable of photodegradation can be treated by the method of the invention. Depending on the exact nature of the organic material various by-products can be obtained. For those organic compounds composed solely of carbon hydrogen and oxygen the process produces water and carbon dioxide as the degradation products. For organic materials containing halogen additionally dilute mineral acid is a degradation product. The process, in any event, produces relatively easily handleable chemicals from often complex organic compounds.

Usually the process of the invention is carried out at room temperature with the rotating plate mounted in a suitable confining reactor equipped with a suitable source of ultraviolet light.

Typical organic compounds which can be treated in accordance with the invention are aliphatic or aromatic hydrocarbons, alcohols, acids, esters, ketones, amines and halogen substituted compounds. Pesticides are other environmentally hazardous organic products eminently suitable for treatment by the process of the invention.

The invention is illustrated in the following Examples in which apparatus as shown in the accompanying drawing was used.

Figure 1:
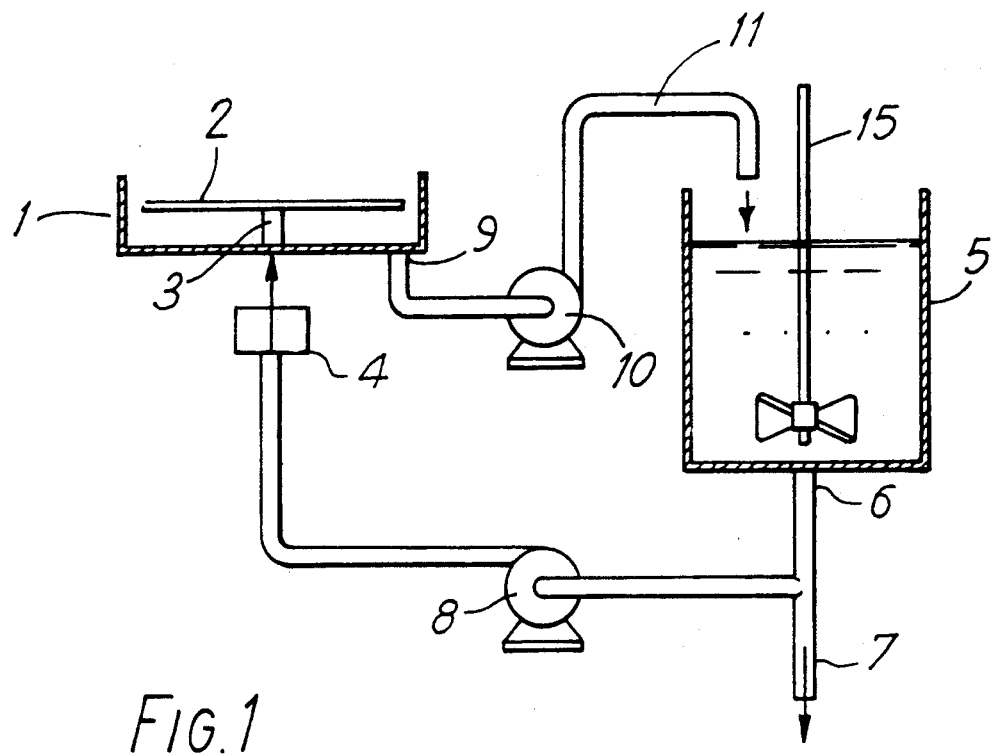
FIG. 1 is a diagrammatic representation of the overall layout.

As shown the apparatus includes a reactor chamber 1 having mounted horizontally therein a rotatable disc 2 on a hollow shaft 3 coupled to a motor 4. A storage tank 5 has an outlet 6 in the base of the tank 5 through which the contents of the tank can be drained through pipe 7. The outlet 6 is also coupled to a pump 8 to feed the contents of the tank 5 through the hollow shaft 3 to the upper surface of the disc 2. The base of the reactor chamber 1 has an outlet 9 to a pump 10 and a return pipe 11 to the tank 5.

Figures 2, 3:
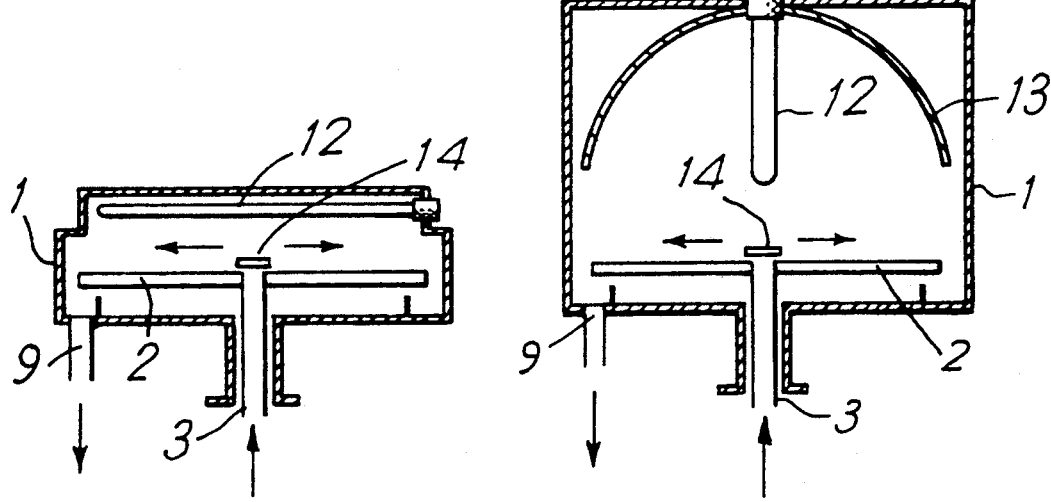
FIG. 2 is one form of reactor.
FIG. 3 is an alternative form of reactor.

FIG. 2 illustrates one form of reactor chamber 1 in which there is horizontally mounted a lamp 12 to produce ultraviolet light. The lamp 12 extends across a diameter of the disc 2.

In FIG. 3 an alternative arrangement of reactor chamber 1 is shown in which the lamp 12 is mounted vertically above but axially i line with the axis of the disc. A reflector 13 is positioned to direct the light onto the disc 2.

The reactor chamber 1 is equipped with an axial deflector plate 14 to deflect flow of liquid form the hollow shaft 3 onto the upper surface of the disc 2. The tank 5 is equipped with a stirrer 15.

As used the rotatable disc 2 was formed from perforated stainless steel and had a diameter of 38 cm. The speed of rotation of the disc in the following experiments was 350 rpm and a liquid flow rate across the upper surface of the disc 2 was maintained at 50 mls per second. The temperature within the reactor chamber 1 was maintained at about 25° C.

EXAMPLE 1

A titanium dioxide catalyst having a surface area of 120 $m^2$ per gram was used. The catalyst was anatase titanium dioxide free of rutile titanium dioxide and had been prepared by hydrolysis of titanyl sulphate solution, neutralisation of the hydrolysis product with an alkali and calcination of the neutralisation product at 500° C. for 4 hours.

An aqueous solution of salicylic acid containing 100 micromoles per liter of the salicylic acid was prepared to which was added the titanium dioxide catalyst in various concentrations of from 0.5 to 4.0 grams per liter.

The solution was fed into the apparatus through hollow shaft 3 as described and illuminated with light from two 15 W low pressure UV lamps as shown in FIG. 2.

Samples of the aqueous solution were analysed and the results showed that the speed of degradation was proportional to the amount of catalyst present with the optimum being about 5 gpl $TiO_2$.

A similar aqueous solution of salicylic acid but free of titanium dioxide was irradiated similarly and no degradation was observed.

EXAMPLE 2

Example 1 was repeated but using a commercially available anatase titanium dioxide having a surface area of about 55 $m^2$ per gram and containing 15% rutile $TiO_2$ available under the name Degussa P25.

It was found that less of the salicylic acid was decomposed as compared to the catalyst of Example 1 and that the optimum concentration of $TiO_2$ was about 3.0 grams per liter.

EXAMPLE 3

Various experiments employing the catalyst of Example 1 were carried out employing a 400 watt medium pressure lamp, a flow rate of 50 cc/sec, a disc speed of 350 rpm and with the organic being salicylic acid at an initial concentration of 100 micromoles per liter. The pH of the solutions were adjusted to various values before treatment and the rates of reaction measured and the values are given in the following table.

| Solution pH | Rate of Reaction ($K_R$) Micromoles/min/liter |
| --- | --- |
| 3 | 0.280 |
| 5 | 0.190 |
| 7 | 0.112 |
| 9 | 0.011 |
| 11 | 0.121 |

The table of $K_R$ is defined by reference to Langmuir-Hinshelwood Kinetics. Clearly use of aqueous solutions acidic in nature increases the rate of degradation of otheorganic material.

We claim:

1. A process for the decomposition of photocatalytically degradable organic material comprising exposing a liquid dispersion of said organic material and anatase titanium dioxide to ultraviolet light and passing said dispersion across the surface of a plate-like member rotating about a central axis perpendicular to the radial plane of said member thereby accelerating said dispersion radially outwardly of said axis across said surface of said member.

2. A process according to claim 1 in which the anatase titanium dioxide has a surface area of from 20 to 200 $m^2/gm$.

3. A process according to claim 1 in which the anatase titanium dioxide has a particle size of from 0.001 to 1.0 micron.

4. A process according to claim 1 in which said liquid dispersion is an aqueous dispersion.

5. A process according to claim 4 in which said aqueous dispersion is acidic.

6. A process according to claim 1 in which the liquid dispersion contains from 0.1 to 10 gpl of said anatase titanium dioxide.

7. A process according to claim 1 in which the liquid dispersion contains 0.1 ppb (parts per billion) to 1000 ppm (parts per million) of the organic material.

8. A process according to claim 1 in which the ultraviolet light is that emitted by a low pressure lamp.

9. A process according to claim 8 in which the ultraviolet light has a wavelength of up to 400 nanometers.

10. A process according to claim 1 in which the plate-like member has the form of a disc having a diameter of from 25 cm to 5 meters.

11. A process according to claim 1 in which the plate-like member has a thickness of from 0.05 to 50 mm.

12. A process according to claim 1 in which the plate-like member is rotated at a speed of from 50 rpm to 10,000 rpm.

13. A process according to claim 12 in which the speed is from 100 rpm to 5,000 rpm.

14. A process according to claim 1 in which the said organic material is a hydrocarbon, an alcohol, an acid, an ester, a ketone, an amine or a halogen substituted compound.

* * * * *